(12) United States Patent
Nölle et al.

(10) Patent No.: US 10,480,652 B2
(45) Date of Patent: Nov. 19, 2019

(54) SEALING DEVICE

(71) Applicant: HAMMELMANN GMBH, Oelde (DE)

(72) Inventors: René Nölle, Oelde (DE); Martin Oberscheidt, Ennigerloh (DE); Gerald Schubring, Oelde (DE)

(73) Assignee: HAMMELMANN GMBH, Oelde (DE)

( * ) Notice: Subject to any disclaimer, the term of this patent is extended or adjusted under 35 U.S.C. 154(b) by 0 days.

(21) Appl. No.: 15/557,501

(22) PCT Filed: Mar. 2, 2016

(86) PCT No.: PCT/EP2016/054417
§ 371 (c)(1),
(2) Date: Sep. 12, 2017

(87) PCT Pub. No.: WO2016/146388
PCT Pub. Date: Sep. 22, 2016

(65) Prior Publication Data
US 2018/0051807 A1    Feb. 22, 2018

(30) Foreign Application Priority Data
Mar. 18, 2015 (DE) .................. 10 2015 104 073

(51) Int. Cl.
*F16J 15/00* (2006.01)
*F16J 15/40* (2006.01)
*F16J 15/44* (2006.01)

(52) U.S. Cl.
CPC ............ *F16J 15/006* (2013.01); *F16J 15/406* (2013.01); *F16J 15/441* (2013.01)

(58) Field of Classification Search
CPC ... F16J 15/16; F16J 15/18; F16J 15/32; E21B 3/02
USPC ................... 277/305, 422, 585, 579
See application file for complete search history.

(56) References Cited

U.S. PATENT DOCUMENTS

| | | | | |
|---|---|---|---|---|
| 1,867,320 A | * | 7/1932 | McEvoy | ............... F16J 1/00 277/338 |
| 2,491,482 A | * | 12/1949 | Dolza | ............... F02B 33/00 123/25 R |
| 3,039,778 A | * | 6/1962 | Sence | ............... F01D 11/003 277/422 |

(Continued)

FOREIGN PATENT DOCUMENTS

| | | |
|---|---|---|
| DE | 2643769 | 3/1978 |
| DE | 3213392 | 11/1982 |

(Continued)

OTHER PUBLICATIONS

International Search Report of PCT/EP2016/054417 dated May 20, 2016.

(Continued)

*Primary Examiner* — Kristina R Fulton
*Assistant Examiner* — L. Susmitha Koneru
(74) *Attorney, Agent, or Firm* — Barnes & Thornburg LLP

(57) ABSTRACT

A sealing device comprising an intermediate bushing, which is located between an outer sleeve and an inner member mounted therein so as to be movable relative thereto and which forms a gap seal, is designed in such a way that chambers that can be filled with a pressurized fluid are provided between the intermediate bushing and the adjacent outer sleeve.

11 Claims, 6 Drawing Sheets

(56) References Cited

U.S. PATENT DOCUMENTS

| | | | | |
|---|---|---|---|---|
| 3,649,032 A | * | 3/1972 | Nelson | E21B 33/043 |
| | | | | 277/322 |
| 4,031,716 A | * | 6/1977 | Zabcik | E21B 17/07 |
| | | | | 175/321 |
| 4,484,753 A | * | 11/1984 | Kalsi | E21B 4/003 |
| | | | | 277/336 |
| 4,537,406 A | * | 8/1985 | Hirasuna | E21B 17/0423 |
| | | | | 277/314 |
| 5,402,936 A | | 4/1995 | Hammelmann | |
| 6,296,255 B1 | | 10/2001 | Hashimoto | |

FOREIGN PATENT DOCUMENTS

| | | |
|---|---|---|
| DE | 9216438 | 1/1993 |
| DE | 19951317 | 4/2000 |
| DE | 10316730 | 10/2004 |
| JP | S49-120953 U1 | 10/1974 |
| JP | H09131700 | 5/1997 |

OTHER PUBLICATIONS

English translation of International Search Report of PCT/EP2016/054417 dated May 20, 2016.
Citation issued in German Application No. 102015104073.5.
Office Action issued in patent app. No. JP2017-567535 (dated Sep. 25, 2018).

\* cited by examiner

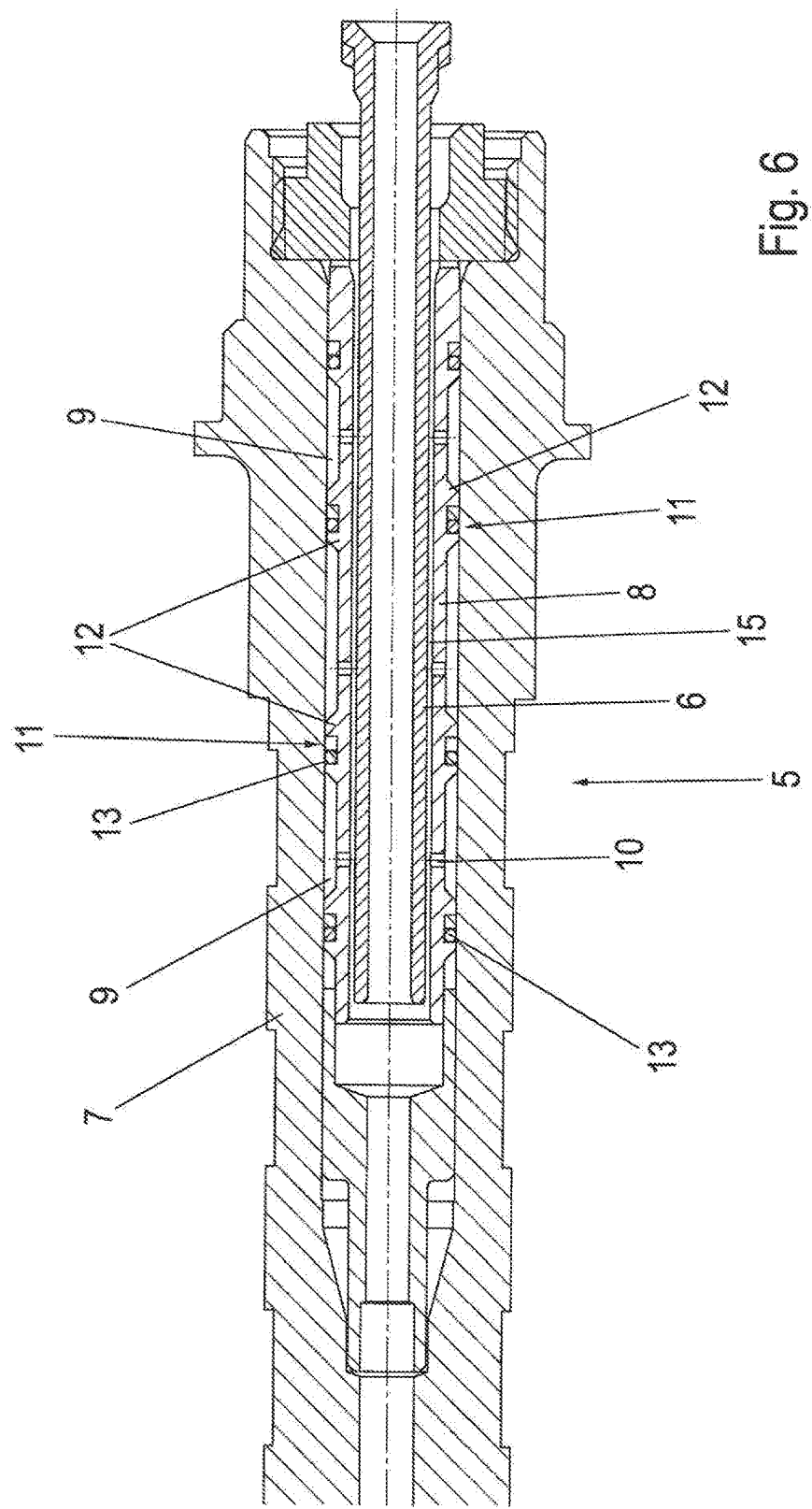

US 10,480,652 B2

SEALING DEVICE

CROSS REFERENCE TO RELATED APPLICATIONS

This application is a U.S. nationalization under 35 U.S.C. § 371 of International Application No. PCT/EP2016/054417, filed Mar. 2, 2016, which claims priority to German Application No. 102015104073.5 filed Mar. 18, 2015.

BACKGROUND AND SUMMARY OF THE DISCLOSURE

The present disclosure is directed to a sealing device having an intermediate bushing arranged between an outer sleeve and an inner body.

Such sealing devices are particularly used where units are operated with applications involving high fluid pressures (200-4000 bar).

Owing to the extreme operating conditions prevailing there, low-friction gap seals are used for sealing the components that are movable relative to each other, i.e. according to the type disposed between a cylindrical inner body and an outer sleeve, which gap seals have an intermediate bushing which preferably consists of a non-ferrous metal and which is disposed between a wall of a bore of the outer sleeve and the inner body.

In this case, a system-induced leakage is accepted, which leads to a considerable loss of energy however. Thus, in a system-optimized known seal, a leakage quantity of about 600 ml/min is obtained at a fluid pressure of 2000 bar for example and a leakage quantity of about 1200 ml/min at a fluid pressure of 3000 bar. However, this is not conducive to an economically optimized operation of the unit.

This also includes the fact that high leakage leads to wear and tear by erosion of the components involved, resulting in a relatively short service life and the resulting repair and downtime costs.

Such sealing devices are used in this case in assemblies in which the relative movement of the inner sleeve to the outer sleeve takes place axially or in a rotating manner.

The rotating unit can, for example, be designed as a rotary drive for a hydraulic tool. In the case of an electric drive of the rotary drive, the outer sleeve is coupled to a rotor which is operatively connected to a stator, whereas the stationary inner body consists of a sleeve, through which the high-pressure fluid is guided.

This object is achieved by a sealing device having the features of claim 1.

As has been found surprisingly, a sealing device according to the present disclosure leads to a marked reduction in the quantity of leakage, since, unlike a sealing device according to the prior art, almost no operation-related expansion of the annular gap is possible any more.

In a sealing device according to the present disclosure, the fluid under high pressure is fed between the inner body and the intermediate bushing, through the through-openings assigned to the respective chambers, to the corresponding chambers, resulting in a pressure profile in the chambers which follows the pressure profile of the annular gap in a step-like manner. Due to this almost complete compensation between internal and external pressure, a gap expansion is virtually completely prevented. The pressure compensation can be optimized by the number of chambers.

An expansion of the gap between the intermediate bushing and the inner body can be influenced by means of the positioning and division of the chambers as well as of the through-openings, wherein at least one through-opening is associated with each chamber.

Instead of a pressure equalization by the fluid flowing through, the outer pressure can be applied by an external pump by omitting the through-openings, through which a fluid with the corresponding pressure is introduced into the chambers. Typically, this outer pressure corresponds to the internal pressure in the annular gap between the inner body and the intermediate bushing. The outer pressure can be adapted to the internal pressure to be determined by means of a corresponding pump control.

While previously, as mentioned above, the leakage quantity has increased disproportionately with increasing fluid pressure, such a disproportionate increase in the leakage depending on the operating pressure is no longer the case. In other words, the permissible operating pressure is only limited by the component strengths, so that larger nominal widths are possible compared to the known seals.

Compared to the aforementioned leakage quantity according to the prior art, a leakage may now be reduced at an operating pressure of 2000 bar of approximately 90 ml/min and at an operating pressure of 3000 bar approximately the same, namely about 92 ml/min.

In addition to the markedly reduced leakage rate, which allows a significantly improved economic operation of the unit due to the thus reduced energy loss, a sealing device according to the present disclosure also may provide a remarkable increase in the service life of the sealing device, which is due to the reduced load and the resulting lower wear of the involved components.

As experiments have shown, the leakage rate in a prior art sealing device and an operating pressure of 2500 bar increases to 1600 ml/min after about 125 hours, while at a higher operating pressure of 2,800 bar and the same running time of the new sealing device, the leakage rate is approximately 150 ml/min, i.e. only about 9%.

As such, a sealing device according to the present disclosure may provide a significant improvement in the economic operation of a unit provided with a sealing device.

This results, on the one hand, from the mentioned lower energy loss and, on the other hand, from the longer service life, since the components involved must be replaced considerably later than before. This is particularly advantageous when the sealing device is used in an electric rotary drive, since the dismantling and/or mounting work is laborious and thus cost-intensive.

BRIEF DESCRIPTION OF THE DRAWINGS

FIG. 6 shows a further embodiment of the invention, likewise in a longitudinal sectional view.

DETAIL DESCRIPTION OF THE DRAWINGS

Figure 1:
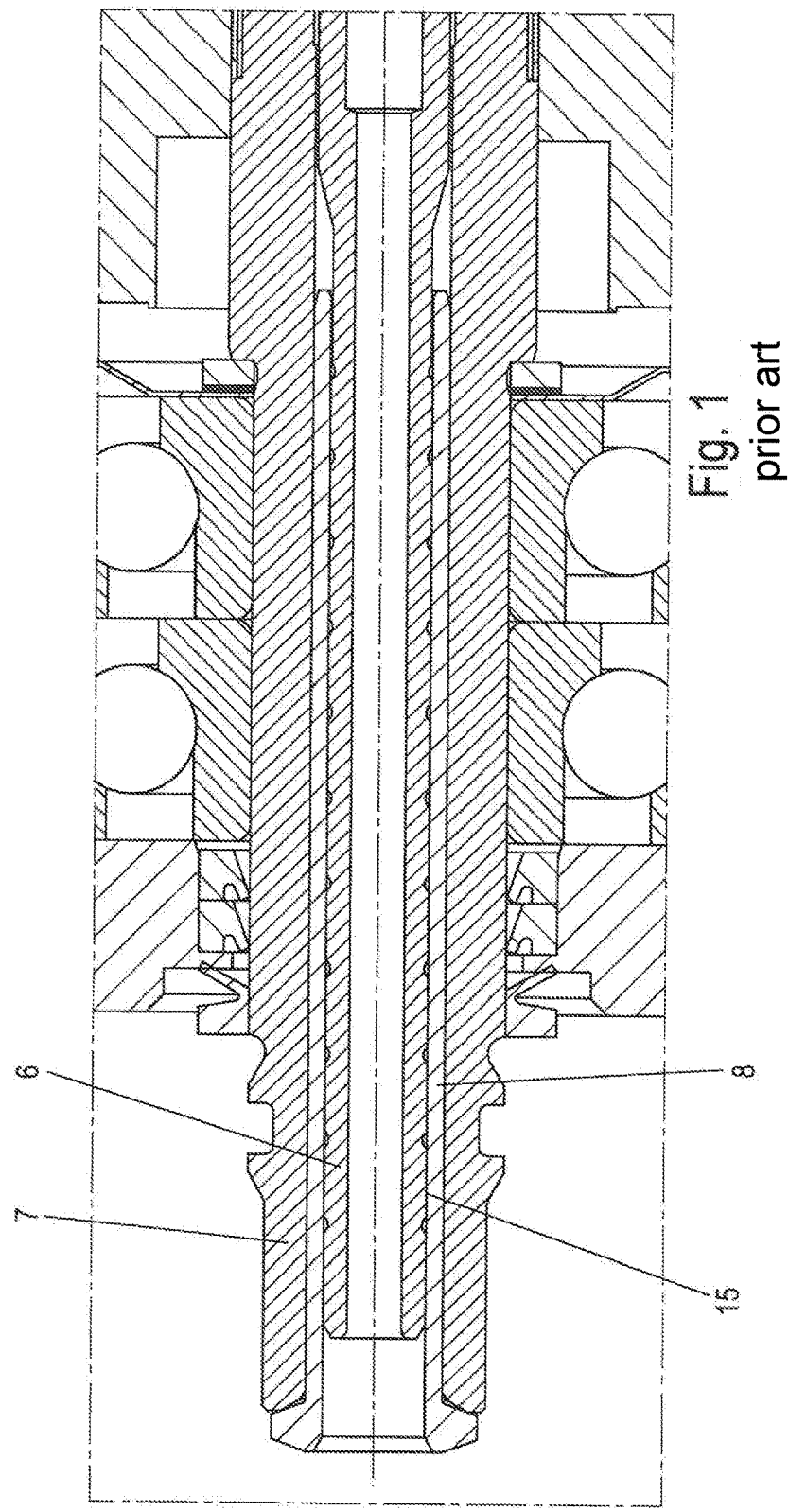
FIG. 1 shows a sealing device according to the prior art in a longitudinal sectional view.

FIG. 1 shows a sealing device according to the prior art, having an inner body 6 designed as a sleeve, an intermediate bushing 8 which surrounds the latter and is mounted in an outer sleeve 7 by forming a gap seal, wherein an annular gap 15 is formed between the inner body 6 and the intermediate bushing 8. With this design, the pressure of the fluid to be sealed causes the sleeve to widen, resulting in increased leakage.

Figure 2:
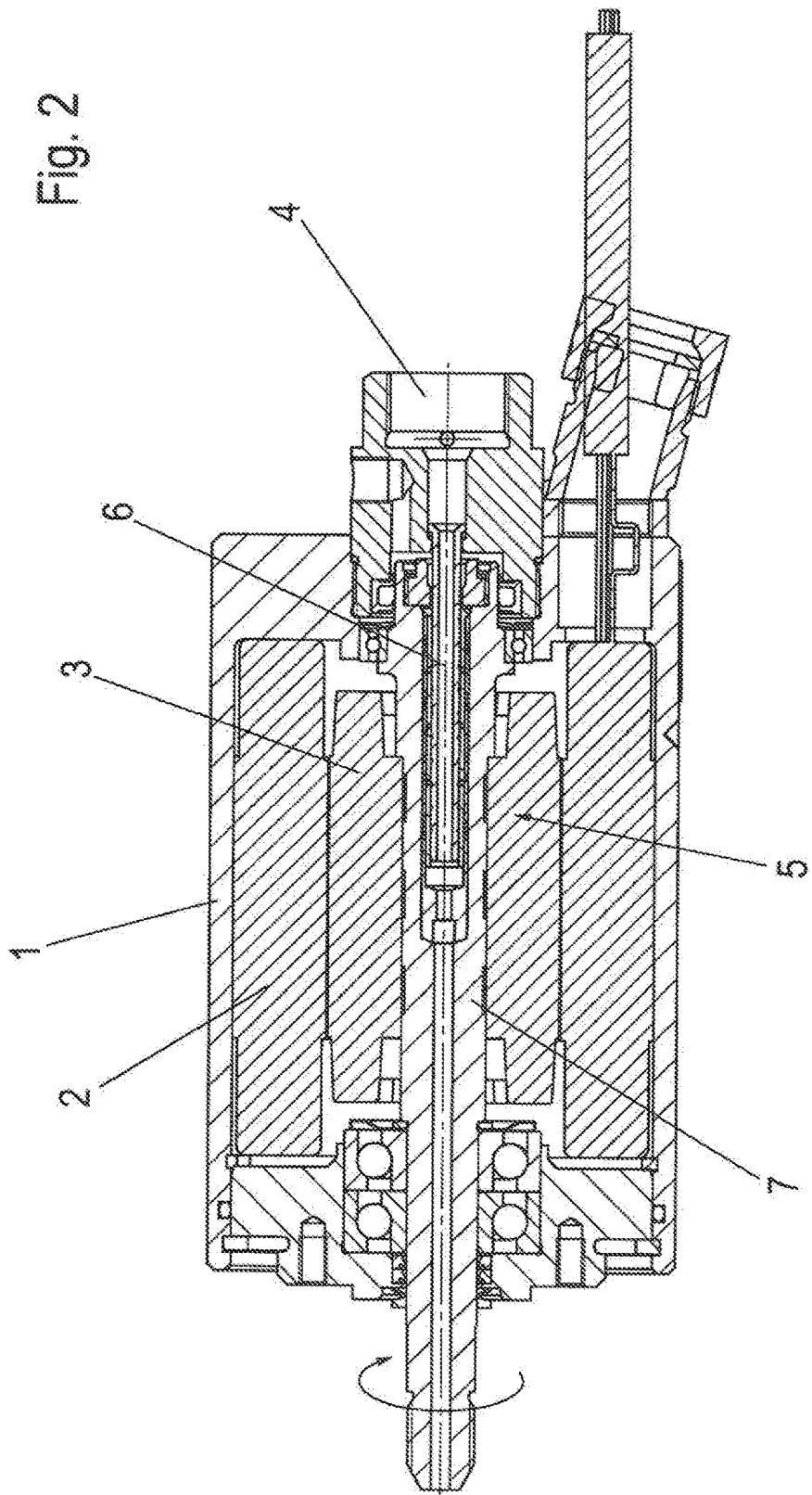
FIG. 2 shows a rotary device provided with a sealing device according to the present disclosure in a longitudinal sectional view.

FIG. 2 shows an electric rotary drive for a hydraulic tool, having a housing 1, a stator 2 mounted therein in a rotationally fixed manner, and a rotor 3 in which the outer sleeve 7 is held in a rotationally fixed manner, through which a fluid under high pressure (>2000 bar) can be supplied via a fluid connection 4.

The outer sleeve 7 is a component of the sealing device 5 according to the invention, which can be seen more clearly in FIGS. 3-6 in enlarged view.

The inner body 6, which is mounted in the outer sleeve 7 and is movable relative to the outer sleeve 7, is arranged in axial alignment with the outer sleeve 7 as a further component of the sealing device 5, i.e., in the example, the inner body 6, which is embodied as an axially consistently open-ended sleeve, is connected in a rotationally fixed manner to the fluid connection 4 and thus to the housing 1, while the outer sleeve 7 is rotatable in relation thereto.

The intermediate bushing 8 is arranged between the outer sleeve 7 and the inner body 6 to form a gap seal, wherein the intermediate bushing 8 may be made of a stainless steel or another suitable material, e.g. ceramics or the like.

According to the invention, chambers 9 are formed between the intermediate bushing 8 and the outer sleeve and are laterally delimited by seals 11, wherein a seal 11 is embodied as a sealing ring 13, for example an O-ring, which is held by a holder 12.

Furthermore, the intermediate bushing 8 has radially or obliquely oriented through-openings 10, which, starting from a formed annular gap 15 between the inner body 6 and the intermediate bush 8, opens into one of the chambers 10. This can be seen particularly clearly in FIGS. 4 and 5.

Figure 3:
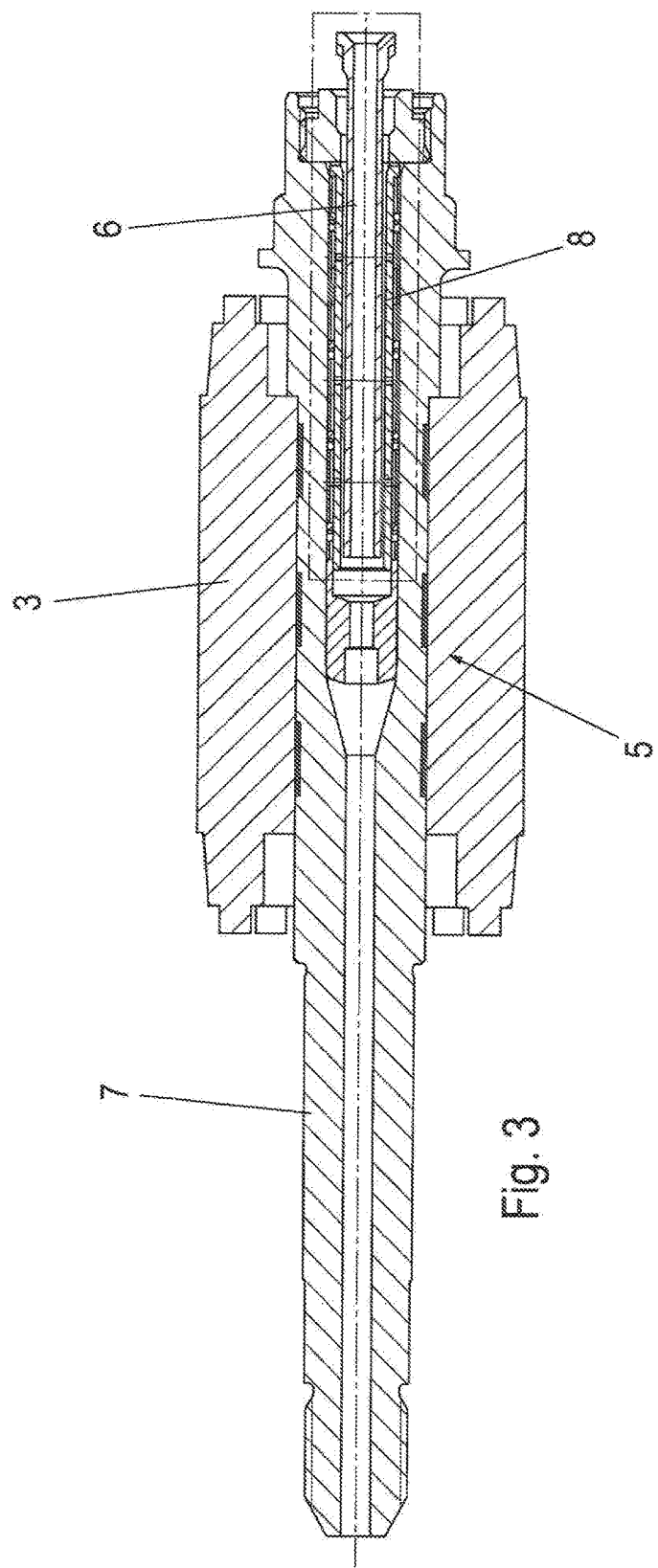
FIG. 3 shows a detail of the rotary drive, likewise in a longitudinal sectional view.
Figure 4:
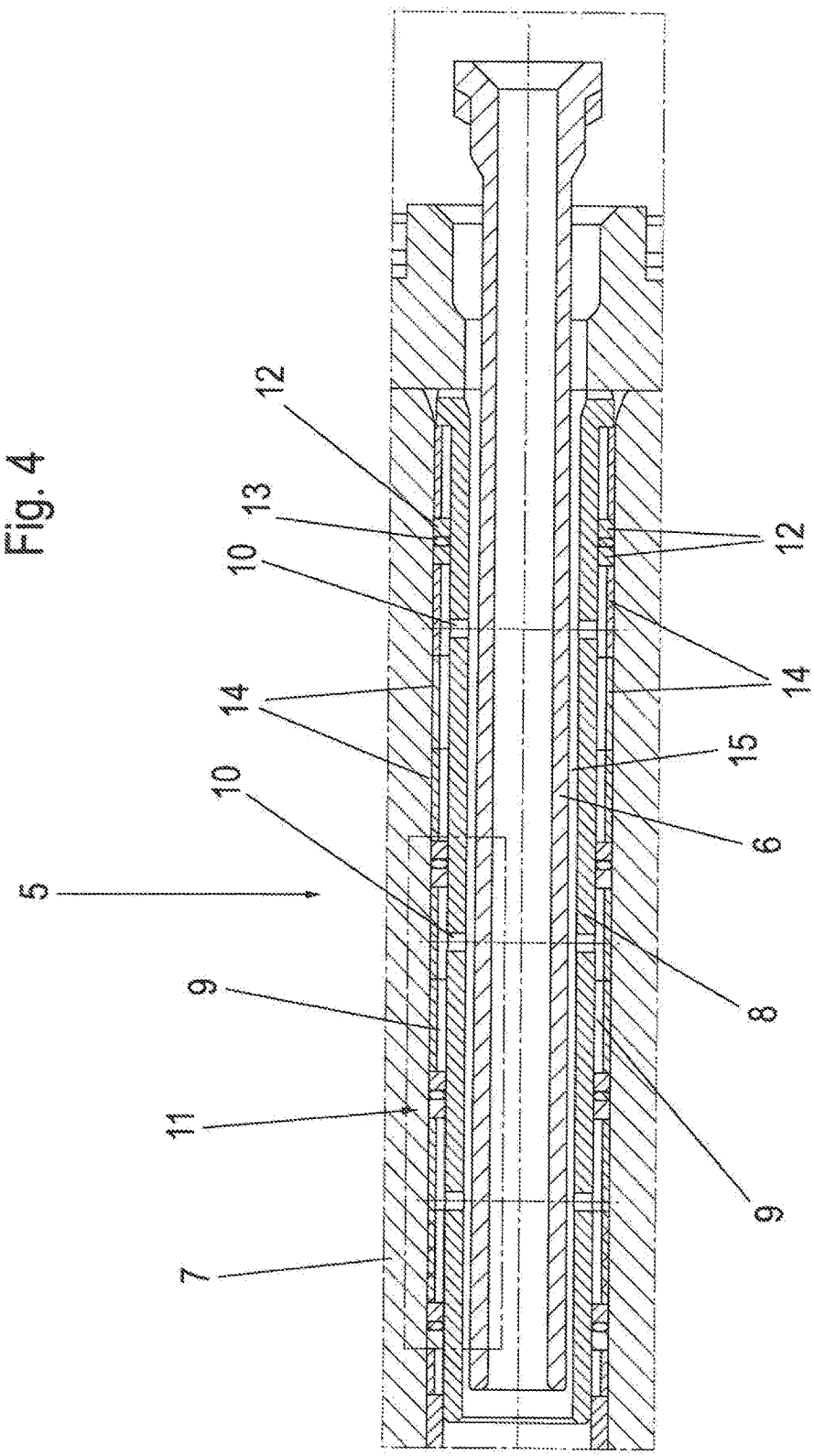
FIG. 4 shows an enlarged view of a section of the detail according to FIG. 3 as a longitudinal sectional view.
Figure 5:
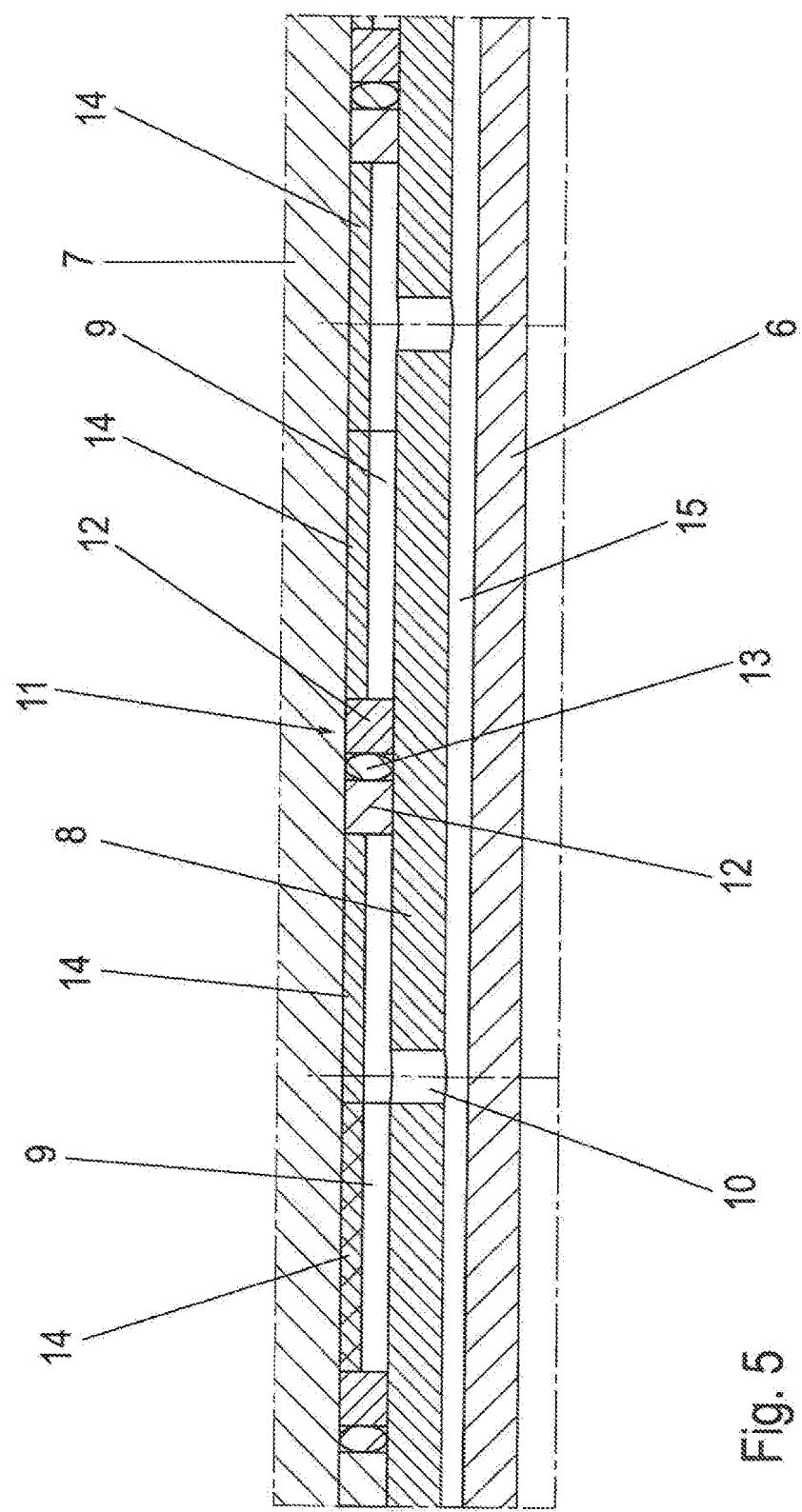
FIG. 5 shows a further enlarged view of the section according to FIG. 4.

For the formation of the chambers, rings 14 are provided which are shown in FIGS. 3-5 and rest against the wall of the outer sleeve 7 and are dimensioned such that their inner diameter is greater than the outer diameter of the intermediate bushing 8, so that the chambers 9 are formed between the rings 14 and the intermediate bushing 8. In this case, the respective seal 11 rests both on the wall of the outer sleeve 7 and on the intermediate bushing 8.

A further variant for the formation of the chambers 9 is shown in FIG. 6. In the absence of the rings 14, the intermediate bushing 8 is provided with groove-like indentations, through which the chambers 9 are formed in cooperation with the wall of the outer sleeve 7. In this case, the holders 12 of the seals 11 are in the form of an integral part with the intermediate bushing 8, which rest against the inner wall of the outer sleeve 7.

In the example, the chambers are circumferentially guided, i.e. they form an annular space. However, it is also conceivable to provide a plurality of chambers 9 in the circumferential direction, wherein in each case at least one through-opening 10 opens into the respective chamber 9.

Instead of a rotational relative movement between the outer sleeve 7 and the inner body 6, as is the case for the rotary drive shown in the example, the relative movement can also take place axially, wherein in this case the inner body 6 can also be formed from a solid material, for example a shaft or rod.

The sealing device can be implemented both with an axially or rotatably movable outer sleeve 7 and a fixed inner body 8 as well as with an axially or rotatably movable inner body 8 and an outer sleeve 7 which stands rigidly thereto.

The invention claimed is:

1. A sealing device, comprising an intermediate bushing arranged concentrically between an outer sleeve and an inner body and movable relative thereto, the intermediate bushing and the inner body defining a single annular gap therebetween, the bushing cooperating with the outer sleeve the inner body, and a plurality of seals disposed between the outer sleeve and the intermediate bushing to define a plurality of chambers which can be filled with a pressurized liquid, the annular gap simultaneously in fluid communication with all of the plurality of chambers.

2. A sealing device according to claim 1, wherein the intermediate bushing comprises radially oriented through-openings which open into the chambers.

3. A sealing device according to claim 1, wherein each chamber is assigned at least one through-opening.

4. A sealing device according to claim 1, wherein each chamber is designed as a circumferential annular space.

5. A sealing device according to claim 1, wherein several chambers are provided which are distributed over the circumference.

6. A sealing device according to claim 1, wherein the outer sleeve is rotatable or axially displaceable relative to the inner body.

7. A sealing device according to claim 1, wherein the seal comprises a sealing ring, which is supported on the inner wall of the outer sleeve and on the intermediate bushing.

8. A sealing device according to claim 7, wherein the sealing ring is held in a holder.

9. A sealing device according to claim 1, further comprising rings resting against the inner wall of the outer sleeve thereby defining the chambers.

10. A sealing device according to claim 1, the intermediate bushing defining groove-like indentations defining the chambers, which indentations are delimited in the axial direction of the intermediate bushing by the integrally formed holders.

11. A sealing device according to claim 1 wherein the chambers are connected to a pump operable to supply a pressurized fluid thereto.

* * * * *